United States Patent [19]

Demeo

[11] Patent Number: 5,138,119
[45] Date of Patent: Aug. 11, 1992

[54] BACKLIT TACTILE KEYBOARD WITH IMPROVED TACTILE AND ELECTRICAL CHARACTERISTICS

[75] Inventor: Gregory B. Demeo, Lydeborough, N.H.

[73] Assignee: Lucas Duralith Corporation, Millville, N.J.

[21] Appl. No.: 669,958

[22] Filed: Mar. 15, 1991

[51] Int. Cl.⁵ .................................... H01H 13/70
[52] U.S. Cl. ........................ 200/5 A; 200/314; 200/512
[58] Field of Search .............. 200/5 A, 512–517, 200/314, 317

[56] References Cited

U.S. PATENT DOCUMENTS

| | | | |
|---|---|---|---|
| 3,699,294 | 10/1972 | Sudduth | 200/243 |
| 3,777,222 | 12/1973 | Harris | 200/5 R X |
| 4,017,676 | 4/1977 | Rabeler et al. | 358/196 |
| 4,060,703 | 11/1977 | Everett, Jr. | 200/5 A |
| 4,124,879 | 11/1978 | Schoemer | 362/26 |
| 4,197,439 | 4/1980 | Mecklenburg et al. | 200/5 A X |
| 4,271,333 | 6/1981 | Adams et al. | 379/368 |
| 4,302,647 | 11/1981 | Kandler et al. | 200/512 |
| 4,314,116 | 2/1982 | Gordon | 200/5 A |
| 4,322,587 | 3/1982 | Burns et al. | 200/5 R |
| 4,323,740 | 4/1982 | Balash | 200/5 A |
| 4,343,975 | 8/1982 | Sado | 200/314 |
| 4365,120 | 12/1982 | Pounds | 200/5 A |
| 4,365,130 | 12/1982 | Christensen | 200/306 |
| 4,373,124 | 2/1983 | Frame | 200/600 |
| 4,471,189 | 9/1984 | Bacon et al. | 200/516 |
| 4,499,343 | 2/1985 | Prioux et al. | 200/5 A |
| 4,596,905 | 6/1986 | Fowler | 200/5 A |
| 4,636,593 | 1/1987 | Novak et al. | 200/5 A |
| 4,684,767 | 8/1987 | Phalen | 200/5 A |
| 4,811,175 | 3/1989 | DeSmet | 362/95 |
| 4,885,443 | 12/1989 | Simcoe et al. | 200/296 |
| 4,916,262 | 4/1990 | Jungels-Butler et al. | 200/5 A |

FOREIGN PATENT DOCUMENTS 2156588A 10/1985 United Kingdom .
2185630A 7/1987 United Kingdom .

*Primary Examiner*—J. R. Scott
*Attorney, Agent, or Firm*—Nixon & Vanderhye

[57] ABSTRACT

Disclosed is a keypad for use with compact and portable cellular telephone systems in which each key is backlit. A partially translucent overlay layer of flexible material includes a raised key. Under the key, in a preferred embodiment, is an actuation layer, which, during operation is depressed downward by the key. Below the actuation layer, is a tactile feedback layer including a dome for each key, in which, after being depressed to a predetermined degree, the dome inverts causing a conductor located below the dome to short conductive traces on a substrate upon which the keypad is mounted. In a preferred embodiment, the keys are backlit by a light source extending through the substrate upon which the keypad is mounted. The tactile feedback layer includes a structure for reducing pressure on the light source when the tactile layer is in the inverted condition, resulting in a thinner keypad with a brighter backlit key and a longer life light source.

39 Claims, 3 Drawing Sheets

BACKLIT TACTILE KEYBOARD WITH IMPROVED TACTILE AND ELECTRICAL CHARACTERISTICS

BACKGROUND OF THE INVENTION

1. Field of the Invention

The present invention generally relates to switch keypads and, more particularly, to an improved rubber keypad useful for cellular portable telephones.

2. Discussion of Prior Art

With the proliferation of portable cellular telephones, there has been an increasing need for telephone keypads which have the individual keys illuminated in some fashion to aid in their operation. An additional necessity of such a keypad is a means for providing a tactile feedback which is an indication that the particular key has been actuated.

In the past, relatively high-profile keypads incorporating plunger-type actuating keys have been utilized to permit back illumination as well as good tactile feedback. Generally, such high-profile keys utilize a carbon conductor or a metallic popple dome rendering back illumination difficult. Such problems have been solved in part by using a separate light pipe (see U.S. Pat. No. 4,124,879) or a thick rubber pad itself as a light pipe (see U.S. Pat. No. 4,636,593) for distribution of required illumination to the keys of the keypad. However, because the thickness of such high-profile keypads requires a substantial increase in the overall dimensions of the cellular portable telephone system, it is desirable to provide a low-profile, rubber keypad with a similar degree of illuminability.

U.S. Pat. 4,916,262 is an example of such a low profile, rubber keypad which permits illumination to pass through a diffuser plate and through various translucent layers of the keypad. However, such a construction suffers from poor simultaneity of tactile feedback and electrical contact. Further, the illumination levels required in order to provide acceptable illumination of the key itself requires an unacceptable power drain during operation.

A further problem with U.S. Pat. 4,916,262 is the existence of a separate shorting layer requiring a further adhesive layer in order to bond the shorting layer in the appropriate interrelationship. The shorting layer, and its necessary adhesive layer, add to the thickness of what is desired to be a low-profile keypad.

It has been proposed to utilize light emitting diodes which provide the desired level of illumination with an acceptable power drain. In order to utilize the light generated by the light emitting diode (LED), it is generally felt necessary to mount the LED directly under the key of the keypad. However, in this instance, the height of the light emitting diode above the printed circuit board upon which it is mounted serves to interfere with operation of the conventional tactile feedback dome unless the dome is spaced a substantial vertical distance from the light emitting diode. Accordingly, the use of LED illuminated rubber keypads has in the past precluded the manufacturer of a low-profile keypad.

SUMMARY OF THE INVENTION

In view of the above and other disadvantages of prior art keypads, it is an object of the present invention to provide an LED equipped keypad which retains a relatively low profile.

It is a further object of the present invention to eliminate the need for a separate shorting layer and its related adhesive layer in the construction of a low-profile keypad.

It is a still further object of the present invention to develop a backlighted tactile key where the lighting device is raised above the top surface of the mounting board for the keypad without adversely affecting the lighting device when activating the key.

It is an additional object of the present invention to improve simultaneity of electrical contact with tactile feedback in a keypad switch.

The above and other objects are achieved in accordance with the present invention by providing a double dome in the tactile or popple element, such that when it is compressed beyond its maximum resistance, it snaps or pops into a depressed condition which will be maintained as long as key pressure is maintained. When the larger dome is in the inverted condition, the smaller dome is not inverted. This can provide a circular ridge at the junction which may serve to concentrate the closure forces between the conductive coating on the dome and the circuit conductors on the substrate.

The double or second and smaller dome is not compressed and serves to provide a clearance between the center portion of the tactile dome and the light emitting diode which may extend above the printed circuit board mount. This as a minimum, permits a reduction in pressure on the LED which would otherwise be applied during actuation of the keypad, while at the same time, permitting the keypad to retain the low profile characteristics.

In a further preferred embodiment, electrodes are conventionally mounted on the printed circuit board around an aperture through which the light emitting diode extends and the shorting electrodes comprise conductors disposed on the under surface of the tactile dome. Thus, during actuation, the tactile dome itself actually contacts and shorts the PCB circuits.

BRIEF DESCRIPTION OF THE DRAWINGS

The above and other objects of the present invention will be better understood by reference to the following drawings wherein.

DETAILED DESCRIPTION OF THE DRAWINGS

Figure 1:
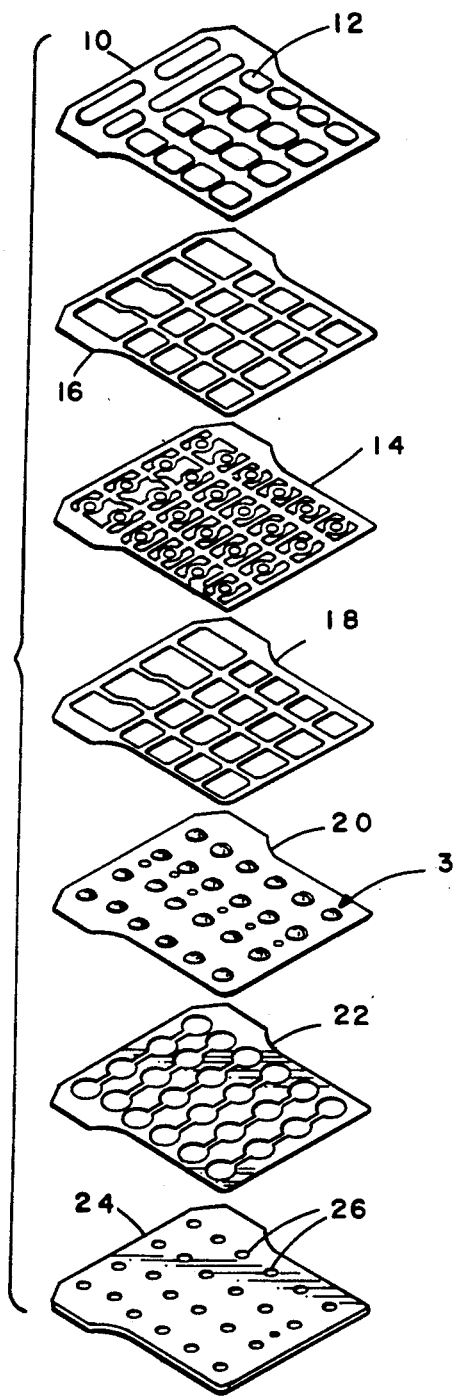
FIG. 1 is an exploded perspective view of one embodiment of the present invention.

Similar reference numerals will be used in the respective Figures for similar parts. With reference to FIG. 1, there is shown a number of elements making up a backlit keypad in accordance with one embodiment of the present invention. A rubber keypad overlay 10 is provided which has raised keys 12. The rubber keypad overlay 10 is bonded to actuator layer 14 by use of graphic adhesive layer 16. The actuator layer 14 is bonded to and over actuator spacer 18 which is a preferred embodiment is a thin layer of adhesive. Similarly, the actuator spacer is bonded to the conductive dome membrane 20 which in turn is also mounted to spacer 22 by a similar adhesive layer (not shown). The spacer also utilizes another adhesive layer (not shown) to bond the entire assembly to the printed circuit board 24 which can of either rigid or flexible design.

The printed circuit board 24 includes a plurality of apertures 26 through which a light emitting diode (not shown) can extend to provide illumination.

In preferred embodiments, the rubber keypad overlay 10 is comprised of a flexible silicon rubber overlay with a flat bottom surface and raised keys 12 on an upper surface. In order to reduce the thickness of the overall keypad, a flat, ridged or embossed polyester sheet could also be used in place of the rubber layer. In one embodiment, the printed circuit board 24 comprises a 0.062 inch G-10 rigid board or Kapton-based flexible circuit available from any electrical supplier. In such an embodiment, the conductive traces 28 are laminated conductors, which form a part of the board, with insulating areas being etched away. A further embodiment would be to utilize a polyester layer with printed silver conductive traces thereon as interdigitated conductors around the LED holes.

Figure 9:
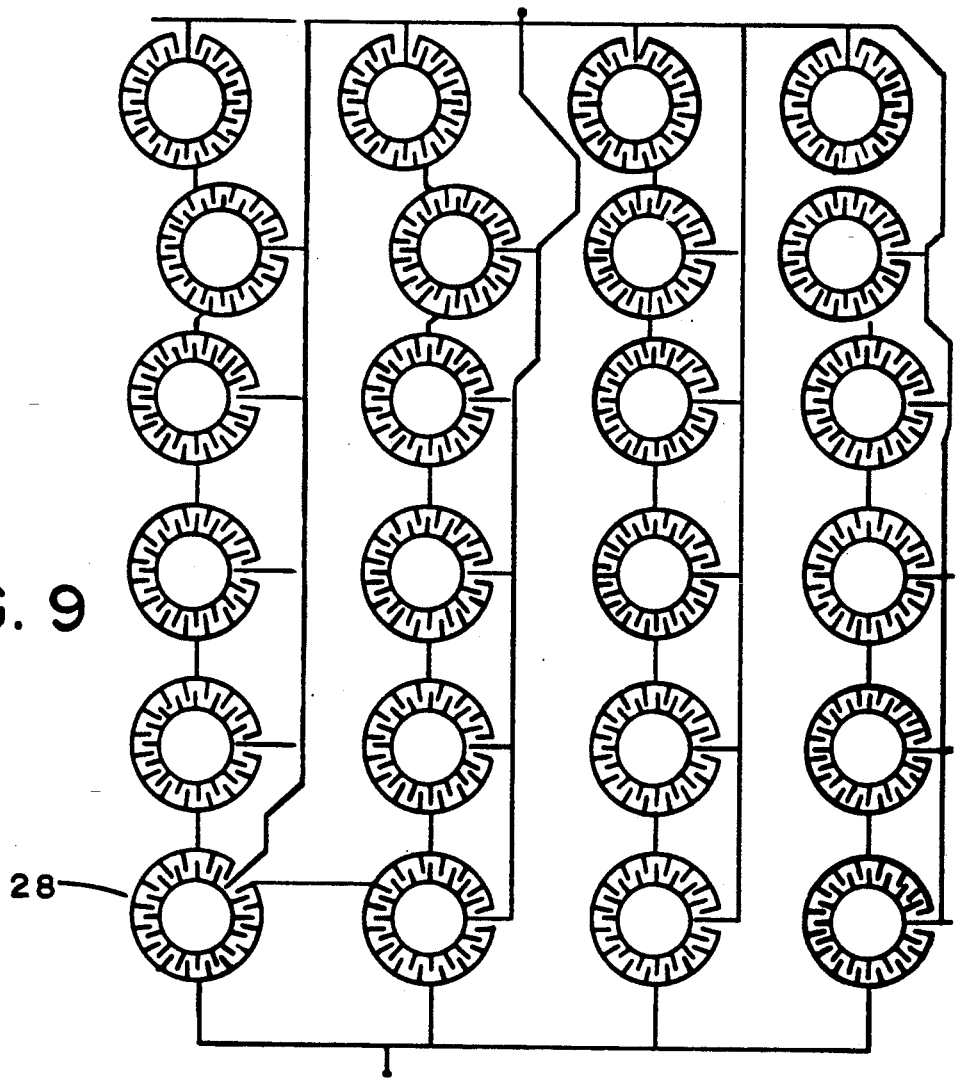
FIG. 9 is a top view of a typical conductive trace pattern in one embodiment of the present invention.

Reference may be had to FIG. 9 which illustrates the interdigitated electrode connections around each of the LED holes. Of course, each of the interdigitated patterns would be connected to a different circuit element so as to provide an identifiable signal with respect to each key which is depressed. The silver trace patterns 28 associated with a particular dome comprises in each instance two separate conductors whose interconnection is made by a bridging conductor element carried by the conductive dome membrane 20.

Figure 3A:
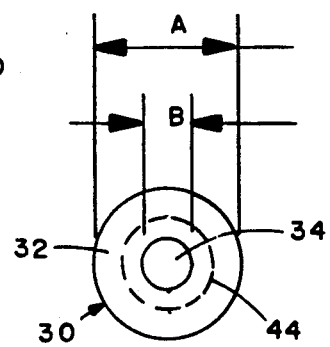
FIG. 3a and 3b are top and side views of one typical tactile dome design.
Figure 3B:
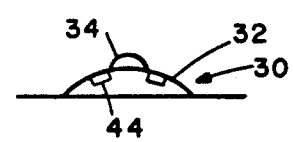

The conductive dome 30 in a preferred embodiment is shown in FIGS. 3a and 3b is comprised of 0.005 inch thick Dupont Mylar (polyester or PET) film which in a preferred embodiment, comprises a large radius dome 32 topped by a small radius dome 34.

In a preferred embodiment, the large radius dome has a diameter at dimension A which is preferably within the range of 0.200 to 0.350 inches (one preferred embodiment is 0.250 inches) and the small radius dome 34 has a diameter at dimension B preferably within the range of 0.060 to 0.125 inches in diameter (one preferred embodiment is 0.062 inches). The vertical height of the outer dome in one embodiment is 0.017 inches and the vertical height of the small radius dome is 0.024 inches (total height above the lower surface of the 0.005 inch thick polyester sheet). The thickness of the sheet can vary depending upon the invert pressure desired, but in a preferred embodiment is between 0.004 and 0.007 inches thick (0.005 in one preferred embodiment).

Obviously, depending upon the tactile characteristics required and the force necessary to cause the large radius dome to "invert", different materials, diameters and height to diameter ratios will be used. It is noted that since the thickness of the polyester sheet generally remains the same for both the large and small radius domes, because of its larger dimensions, the large radius dome will be easier to deform than the small radius dome. Consequently, upon actuation of a key, the large radius dome will collapse providing the tactile feedback well before the pressure level is reached necessary to begin to cause the small radius dome to collapse.

The actuator spacer 18 in a preferred embodiment is a 0.002 inch layer adhesive 3M adhesive #3M 467. However, if a thicker spacer is desired, a sandwich of a 0.002 inch layer of Dupont Mylar (Polyester Teraphthalate or PET) with a 0.002 inch layer of 3M adhesive #3M 467 on each side will provide a suitable spacer 0.006 inches thick.

Figure 2:
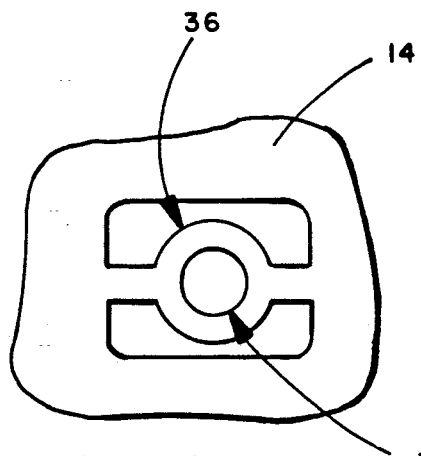
FIG. 2 is a plan view of a portion of an actuator layer.

The actuator layer itself in a preferred embodiment comprises a 0.007 inch Mylar (PET) layer with a cutout pattern which is shown in more detail in FIG. 2. As will be more clearly seen later with reference to FIGS. 6 and 7, the actuator layer 14 in effect is a suspended ring having an outer diameter at 36 which in a preferred embodiment is within the range of 0.150 to 0.250 inches and an inner diameter of 0.060 to 0.125 inches. It is noted that in a preferred embodiment the inner diameter of the ring 38 is approximately the same size as the diameter of the small radius dome 34 and the interrelationship therebetween will be seen with reference to FIGS. 6 and 7. Furthermore, if it is desirable to stiffen the actuator even more, the inner or outer edges of the ring (or both) can be embossed with a ring 54 as shown on the dome in FIG. 7.

It is noted that the graphic adhesive layer 16 in a preferred embodiment comprises 0.005 inches of silicon adhesive available from 3M Corporation, adhesive #3M 9675 used with a primer to promote adhesion. However, an alternative embodiment would be a 0.002 inch thick layer of #3M 9732 adhesive, with or without a primer. The other adhesive layers (not shown) in preferred embodiments would be 0.002 inch layers of 3M adhesive #3M 467. While adhesives have been shown as a means for maintaining relative positions of the layers, different types of adhesives could be used which are compatible with the materials chosen and indeed materials other than adhesives could be used to maintain the position of the layers (such as thermal bonding or locating pins which are subsequently bonded between the stack of layers).

Figure 4:
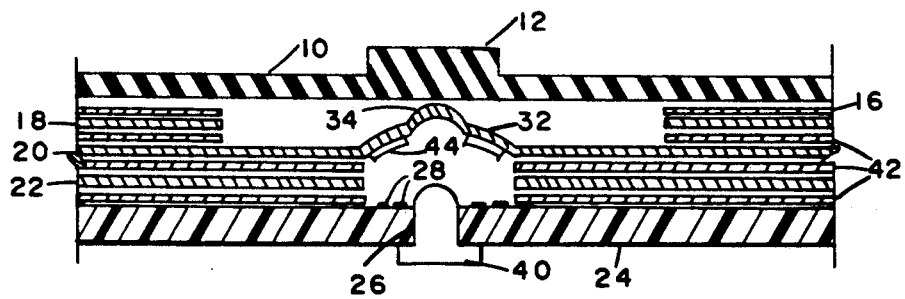
FIG. 4 is a side cross-sectional view of one embodiment of the present invention.
Figure 5:
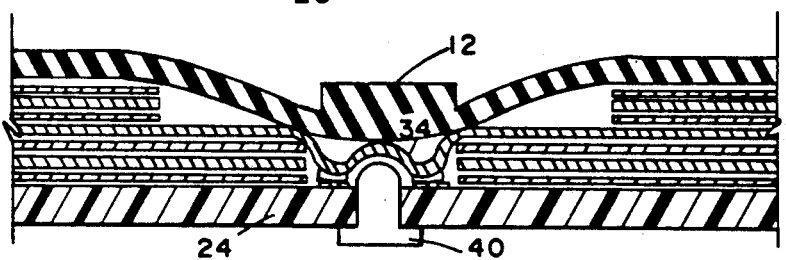
FIG. 5 is a side cross-sectional view of the embodiment disclosed in FIG. 4 in an actuated condition.
Figure 6:
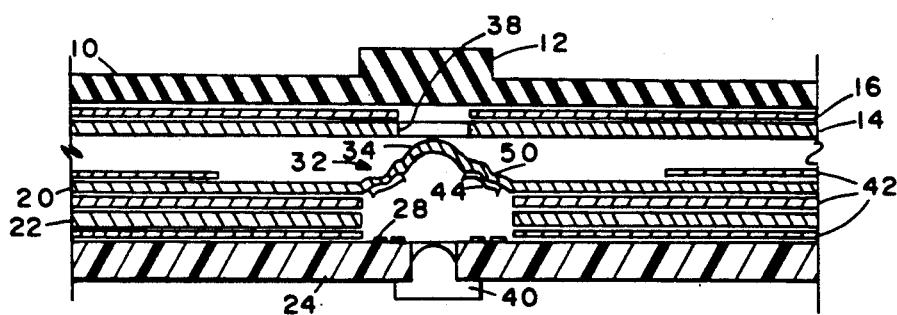
FIG. 6 is a side cross-sectional view of a further embodiment of the present invention.

While not absolutely critical for operation, one preferred embodiment of applicant's invention utilizes actuator layer 24 and a cross-sectional view of this embodiment is illustrated in FIG. 6. However, an embodiment not utilizing the actuator layer is shown in FIG. 4 in the unactuated condition and in FIG. 5, in the actuated condition. With reference to FIGS. 4 and 5, the light emitting diode 40 protrudes through aperture 26 and may project above printed circuit board 24 by as much as 0.12 inches or more in order to provide the desired lighting of the raised key 12 on rubber keypad overlay 10.

The polyester adhesive layers 42 are shown and serve to mount the dome spacer layer 22, the conductive dome membrane 20 and the actuator spacer 18 to the printed circuit board 24. The graphic adhesive layer 16 may be a different type of adhesive layer suitable for mounting the rubber keypad overlay 10 on the stacked assembly. The lower trace patterns 28 are illustrated on the printed circuit board surrounding LED 40. Conductive material 44 is located on the underside of the large radius dome 32 and may be applied by the vapor deposition, printing or other conventional methods for providing a conductive layer on a polyester dome. In a preferred embodiment, a conductive silver coating is applied to the under surface of the dome.

The operation of the FIG. 4 device is illustrated in FIG. 5 whereupon raised key 12 has been depressed. As the key is depressed, it can be seen that it in turn depresses the small radius dome 34 providing an increasing compression force to the large radius diameter dome 32. A force level will be reached at which the large radius dome 32 will invert to the conditions shown in FIG. 5 allowing conductive material 44 to "short" or interconnect the interdigitated lower trace patterns 28. This process of inverting or "snapping" provides a tactile indication to the user that will coincide with the effective actuation of the switch. The inverting of the dome also provides an actuation force for closure of the electrical switch formed between the trace patterns 28 and the conductive material 44. Where a separate shorting layer is utilized, it is sometimes more difficult to obtain simultaneity of electrical contact with the inverting action of the large radius dome. However, where the conductive dome approach is used and a conductive layer 44 is applied to the lower surface of the larger dome there is a greater probability of electrical shorting between the lower trace patterns 28.

It will be seen in the FIG. 4 and FIG. 5 embodiment that the pressure of the raised key 12 is transferred directly to the small radius dome 34 which then depresses the large radius dome 32 until it "inverts" to cause electrical interconnection of the electrical trace patterns 28. It will be seen, however, that even in its collapsed state, the small radius dome 34 maintains a clearance with LED 40 (in a preferred embodiment) or at least contacts LED 40 with less force than would be the case if only a single large radius dome were utilized. This feature permits LED 40 to be mounted at a sufficient distance above the printed circuit board 24 to provide good illumination of the raised key 12 without requiring an exceptionally thick keypad assembly. It will be seen that based upon the above discussion, varying thicknesses of the layers illustrated in FIGS. 4 and 5 can be utilized to accommodate the desired extension of LED 40 above the printed circuit board to minimize the pressure of the inverted dome on the LED itself. Different apertures with respect to these spacers will also provide different operational characteristics depending again upon the thickness of the materials used, the force necessary to provide "inverting", etc.

In FIG. 6, a keypad similar to that illustrated in FIG. 1 is shown including the actuator layer 14. The actuator layer in a preferred embodiment would be of the form illustrated in FIG. 2 with the inner diameter of the ring 38 being seen as the aperture in the actuator layer. The FIG. 6 embodiment illustrates the use of the top layer of adhesive 42 as the sole actuator spacer. During operation of the FIG. 6 embodiment, it can be seen that the raised key 12 will deflect the actuator layer 14 downward such that either first contact will be between the actuator layer 14 and the large radius dome 32 around the inner edge of inner diameter 38 or even if there is initial contact between the small radius dome 34 and the underside of raised key 12, this will be minimal contact compared to the contact between the actuator layer and the large radius dome. This will result in a more positive actuation of the inverting characteristic of the large radius dome 32 and a better "tactile" feel to the switch.

FIG. 6 also illustrates a circular dimpling 50 which when coated with a conductive coating appears to concentrate the actuation contact force between conductive material 44 and the trace patterns 28 during inversion of the dome resulting in a more positive electrical contact. FIG. 6 also illustrates an embodiment in which the light source 40 does not extend above the lower substrate 24 which is also applicable to the other illustrated embodiments.

In the FIG. 4 and 5 embodiment, due to the silicon rubber nature of the undersurface of raised key 12, it is deformed during actuation, at least to a certain degree, by the small radius dome 34 prior to "inverting" of the large radius dome. This deformation would require a substantially longer key stroke and perhaps a less definite feel to the switch actuation. This problem is overcome with the use of an actuation layer. The drawback of the FIG. 6 and FIG. 7 embodiment, of course, is that it requires one additional polyester layer along with the necessary adhesive to mount that layer and thus comprises a slightly thicker keypad sandwich. The use of an actuator layer 14 as in FIG. 6, allows direct transmission of the key depression force to the large radius dome 32 without the necessity to contact small radius dome 34.

Figure 7:
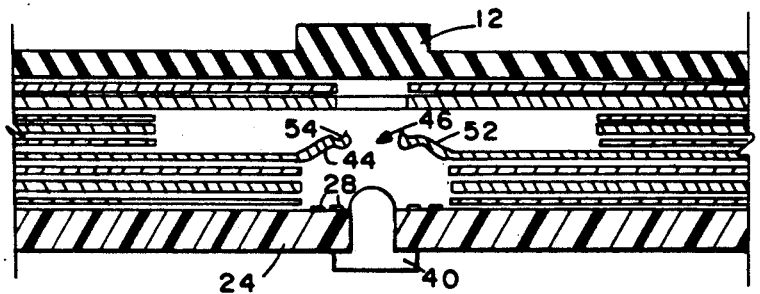
FIG. 7 is a side cross-sectional view of a still further embodiment of the present invention.

In some embodiments, as shown in FIG. 7, it will be unnecessary to utilize small radius dome 34 and the large radius dome 32 can conveniently have aperture 46 located therein. The operation is similar to the operation of the embodiments shown in FIGS. 4 and 6 except that there is no danger of the small radius dome striking or exerting any force on the upper portion of LED 40. In the device of FIG. 7, an alternate embodiment would be the utilization of a metal dome 52 which permits sufficient light from LED 40 to illuminate raised key 12 through aperture 46 and, due to its conductivity, eliminates the need for separate conductive material 44 to short lower trace patterns 28. In embodiments, such as FIG. 7, in which a large radius dome is utilized with a centrally located aperture, it may be necessary to provide an embossed ring 54 around aperture 46 comprising in effect a strengthening ridge, in order to stiffen the edge of the aperture to aid in the "inverting" action of the dome. Such an embossed ring might be of greater necessity in a single dome made of polyester plastic with an aperture.

One benefit of the present invention is the utilization of a conductive dome to eliminate the need for a separate shorting layer as disclosed in U.S. Pat. No. 4,916,262. However, where it is desirable to utilize an LED in order to illuminate the raised key in a device such as U.S. Pat. No. 4,916,262, a conductive shorting layer could advantageously be used in combination with a tactile dome in a fashion similar to that illustrated in FIG. 8. Instead of spacer layer 22, a shorting layer 48 would be provided which could either be conductive metal or be a non-conductive substrate as illustrated with conductive material 44 located thereon.

Figure 8:
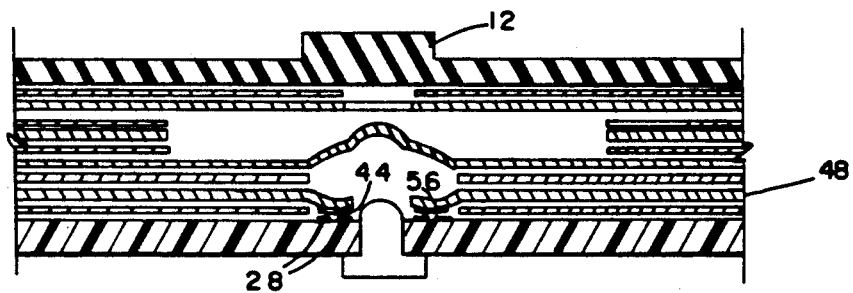
FIG. 8 is a side cross-sectional view of an additional embodiment of the present invention.

The operation of the FIG. 8 embodiment is similar to the other embodiments in that when the large radius dome "inverts", it forces the conductive portion of the shorting layer to contact the lower trace patterns closing the switch. The double dome configuration again can be advantageously utilized to provide protection to the LED, while at the same time maintaining a very low profile and yet well illuminated key. Where a metallic dome is desirable for tactile feedback characteristics, the ring shaped actuator layer can be advantageously utilized to improve the pressure distribution from the key to the dome. Further, contact between the conductive material 44 and the trace patterns 28 can be improved by conductive ridge 56 which improves conductivity by concentrating the contact force In view of the above, and with respect to the level of skill of those having ordinary skill in the keypad switch art, many modifications and embodiments of the present invention will be obvious. As noted earlier, different materials can be used for the various layers and as disclosed in some embodiments, certain layers can be eliminated. Different adhesives or other methods of bonding the layers to an adjacent layer or maintaining the relative position of the elements in the keypad "sandwich" can be utilized. For example, different sources of illumination can be provided other than light emitting diodes, such an incandescent lights, electrode luminescent light systems, etc. Further, it is unnecessary to have the light source located directly under the key and indeed it could be located off to one side It would be desirable to shift the location of the small radius domes so as to coincident with the light emitting diode, thereby providing the benefits of the direct alignment, although some benefits of the present invention could be realized with some small misalignment between the light source and the conductive dome.

Therefore, the above discussed preferred embodiments by way of example only and additional modifications and variations thereof will become obvious to those of ordinary skill in the art in view of the present specification. Therefore, this invention is limited only by the claims appended hereto.

What is claimed is:

1. A keypad for mounting over a substrate and providing at least one key, said at least one key being backlit by at least one light source, said keypad comprising in combination:

an at least partially translucent overlay layer means having a top surface with at least a portion of said top surface comprising at least one key;

tactile layer means, located under said overlay layer means and having at least one collapsible resilient dome substantially aligned with a corresponding said at least one key, for providing a tactile feedback and an actuation force when said at least one key is depressed a predetermined amount and said at least one resilient dome inverts, each of said at least one resilient, dome including a smaller dome thereon, said smaller dome comprising a means for improving force distribution when said at least one resilient dome inverts and for permitting passage of light from said at least one light source to said at least one key;

circuitry layer means, located under said tactile layer means and on said substrate, having at least one conductor pair located thereon, said at least one conductor pair being substantially aligned with a corresponding dome of said tactile layer;

shorting means, with at least one conductive area located between said at least one resilient dome of said tactile layer means and a corresponding said at least one conductor pair of said circuitry layer means and responsive to said tactile layer means, for shorting a corresponding said at least one conductor pair when said key is depressed and said at least one resilient dome inverts, said shorting means including means for passing light from said at least one light source to said at least one key; and means for maintaining the relative positions of said overlay layer means, said tactile layer means, said circuitry layer means, and said shorting means.

2. The keypad according to claim 1, wherein said at least one key comprises a plurality of keys, each of said keys comprising a raised key portion on said overlay layer means.

3. The keypad according to claim 1, wherein each of said at least one light source comprises at least one light emitting diode.

4. The keypad according to claim 1, wherein wherein there is further included a spacer layer means, having at least one aperture thereon, said at least one aperture being substantially aligned with a corresponding said at least one key, for spacing said tactile layer means from said substrate.

5. The keypad according to claim 1 wherein said substrate comprises a rigid, non-conductive material.

6. The keypad according to claim 1, wherein said shorting layer means comprises a conductive portion of a lower surface of said at least one resilient dome of said tactile layer means.

7. The keypad according to claim 1, wherein said means for maintaining comprises a separate adhesive layer located between each of said layers of said keypad.

8. The keypad according to claim 1, wherein said at least one resilient dome includes a circular dimple thereon, said circular dimple comprising a means for concentrating said actuation force provided by said tactile layer means.

9. The keypad according to claim 1, wherein said shorting layer means includes a conductive ridge means for improving electrical contact between said conductor at least one pair.

10. A keypad for mounting over a substrate and providing at least one key, said at least one key being backlit by at least one light source, said keypad comprising in combination;

an at least partially translucent overlay layer means having a top surface with at least a portion of said top surface comprising at least one key;

an actuation layer means, located under said overlay layer means, for concentrating force from said at least one key at at least one point When said at least one key is depressed during operation, said actuation means including means for permitting passage of light from said at least one light source to said at least one key;

a tactile layer means, located under said actuation layer means and having at least one metal collapsible resilient dome, said at least one dome being substantially aligned with a corresponding said at least one point of said actuation layer and said key, for providing a tactile feedback and an actuation force when said at least one key is depressed a predetermined amount and said at least one resilient dome inverts;

a circuitry layer means, located under said tactile layer means and on said substrate, having at least one conductor pair located thereon, said at least one conductor pair being substantially aligned with a corresponding dome of said tactile layer, said resilient dome comprising a means for shorting a corresponding said at least one conductor pair when said key is depressed and said at least one resilient dome inverts, said at least one resilient dome including a generally central aperture comprising a means for passing light from said at least one light source to said at least one key; and means for maintaining the relative positions of said overlay layer means, said actuation layer means, said tactile layer means, and said circuitry layer means.

11. The keypad according to claim 10, wherein said at least one key comprises a plurality of keys, each of said keys comprising a raised key portion on said overlay layer means.

12. The keypad according to claim 10, wherein said means for maintaining comprises a separate adhesive layer located between each of said layer means of said keypad.

13. The keypad according to claim 10, wherein said actuator layer means includes a plurality of actuating strips, each actuating strip being substantially aligned with a corresponding key, each actuating strip including a ring, said ring located substantially under said key.

14. The keypad according to claim 10, wherein there is further included a spacer layer means, having at least one aperture thereon, said at least one aperture being substantially aligned with a corresponding said at least one key and said at least one point of said actuation layer, for spacing said tactile layer means from said substrate.

15. The keypad according to claim 10, wherein said substrate comprises a rigid, non-conductive material.

16. The keypad according to claim 10, wherein said at least one resilient dome includes a circular dimple thereon, said circular dimple comprising a means for concentrating said actuation force provided by said tactile layer means.

17. The keypad according to claim 10, wherein said at least one resilient dome includes a strengthening ridge around said aperture.

18. A keypad for mounting over a substrate and providing at least one key, said at least one key being backlit by at least one light source, said keypad comprising in combination;
an at least partially translucent overlay layer means having a top surface with at least a portion of said top surface comprising at least one key;
an actuation layer means, located under said overlay layer means concentrating force from said at least one key at at least one point when said at least one key is depressed during operation, said actuation means including means for permitting passage of light from said at least one light source to said at least one key;
a tactile layer means, located under said actuation layer means and having at least one collapsible resilient dome, said at least one dome being substantially aligned with a corresponding said at least one point of said actuation layer and said key, for providing a tactile feedback and an actuation force when said at least one key is depressed a predetermined amount and said at least one resilient dome inverts, said tactile layer means including a generally central aperture comprising a means for permitting passage of light from said at least one light source to said at least one key, said tactile layer means including a means for stiffening said dome around said aperture;
a circuitry layer means, located under said tactile layer means and on said substrate, having at least one conductor pair located thereon, said at least one conductor pair being substantially aligned with a corresponding dome of said tactile layer;
shorting layer means, with at least one conductive area located between said at least one resilient dome and a corresponding said at least one conductor pair, for shorting a corresponding said at least one conductor pair when said key is depressed and said at least one resilient dome inverts; and
means for maintaining the relative positions of said overlay layer means, said actuation layer means, said tactile layer means, said circuitry layer means and said shorting layer means.

19. The keypad according to claim 18, wherein said at least one key comprises a plurality of keys, each of said keys comprising a raised key portion on said overlay layer means.

20. The keypad according to claim 18, wherein said means for maintaining comprises a separate adhesive layer located between each of said layer means of said keypad.

21. The keypad according to claim 18, wherein said shorting layer means comprises a conductive portion of a lower surface of said at least one resilient domes.

22. The keypad according to claim 18, wherein said actuator layer means includes a plurality of actuating strips, each actuating strip being substantially aligned with a corresponding key, each actuating strip including a ring, said ring located substantially under said key.

23. The keypad according to claim 18, wherein there is further included a spacer layer means, having at least one aperture thereon, said at least one aperture being substantially aligned with a corresponding said at least one key and said at least one point of said actuation layer means, for spacing said tactile layer means from said substrate.

24. The keypad according to claim 18, wherein said substrate comprises a rigid, non-conductive material.

25. The keypad according to claim 18, wherein said at least one resilient dome includes a circular dimple thereon, said circular dimple comprising a means for concentrating said actuation force provided by said tactile layer means.

26. The keypad according to claim 18, wherein said at least one resilient dome includes a strengthening ridge around said aperture.

27. The keypad according to claim 18, wherein said shorting layer means includes a conductive ridge means for improving electrical contact between said at least one conductor pair.

28. A keypad for mounting over a substrate and providing at least one key, said at least one key being backlit by at least one light source said keypad comprising in combination;
an at least partially translucent overlay layer means having a top surface with at least a portion of said top surface comprising at least one key;
an actuation layer means, located under said overlay layer means, for concentrating force from said at least one key at at least one point when said at least one key is depressed during operation, said actuation means including means for permitting passage of light from said at least one light source to said at least one key;
a tactile layer means, located under said actuation layer means and having at least one collapsible resilient dome, said at least one dome being substantially aligned with a corresponding said at least one point of said actuation layer and said key, for providing a tactile feedback and an actuation force when said at least one key is depressed a predetermined amount and said at least one resilient dome inverts, said at least one resilient dome including a smaller dome thereon, said smaller dome comprising a means for improving force distribution when said at least one resilient dome inverts and for permitting passage of light from said at least one light source to said at least one key;

a circuitry layer means, located under said tactile layer means and on said substrate, having at least one conductor pair located thereon, said at least one conductor pair being substantially aligned with a corresponding dome of said tactile layer;

shorting layer means, with at least one conductive area located between a corresponding point of said tactile layer means and a corresponding said at least one conductor pair of said circuitry layer means and responsive to said tactile layer means, for shorting a corresponding said at least one conductor pair when said key is depressed and said at least one resilient dome inverts, said shorting layer means including means for passing light from said at least one light source to said at least one key; and means for maintaining the relative positions of said overlay layer means, said actuation layer means, said tactile layer means, said circuitry layer means and said shorting layer means.

29. The keypad according to claim 28, wherein said at least one light source extends above said substrate, and said smaller dome comprises a means for reducing pressure on said at least one light source.

30. The keypad according to claim 28, wherein said at least one key comprises a plurality of keys, each of said keys comprising a raised key portion on said overlay layer means.

31. The keypad according to claim 28, wherein said shorting layer means comprises a conductive portion of a lower surface of said at least one resilient domes.

32. The keypad according to claim 28, wherein said means for maintaining comprises a separate adhesive layer located between each of said layers of said keypad.

33. The keypad according to claim 28, wherein said actuator layer means includes a plurality of actuating strips, each actuating strip being substantially aligned with a corresponding key, each actuating strip including a ring, said ring located substantially under said key.

34. The keypad according to claim 28, wherein there is further included a spacer layer means, having at least one aperture thereon, said at least one aperture being substantially aligned with a corresponding said at least one key and said at least one point of said actuation layer means, for spacing said tactile layer means from said substrate.

35. The keypad according to claim 28, wherein said substrate comprises a rigid, non-conductive material.

36. The keypad according to claim 28, wherein said at least one resilient dome includes a circular dimple thereon, said circular dimple comprising a means for concentrating said actuation force provided by said tactile layer means.

37. The keypad according to claim 28, wherein said shorting layer means includes a conductive ridge means for improving electrical contact between said at least one conductor pair.

38. A keypad for mounting over a substrate and providing at least one key, said at least one key being backlit by at least one light source, said light source extending above said substrate, said keypad comprising in combination:

an at least partially translucent overlay means having a top surface with a plurality of protruding portions producing keys, and having a substantially flat bottom surface;

a first adhesive layer having an outer edge portion bonded to the bottom surface of the overlay means at at least the periphery thereof;

an actuation layer having a top surface bonded by said first adhesive layer to said overlay means, having a bottom surface and having a plurality of pairs of cavities, each pair of cavities including one cavity separated by an actuating strip from another cavity in said pair of cavities, each actuating strip being substantially aligned with a corresponding key, each actuating strip including a ring, said ring located substantially under said key;

a second adhesive layer having an outer edge portion bonded to at least to the periphery of a bottom surface of said actuator layer;

a tactile layer having a top surface bonded by said second adhesive layer to said actuation layer, having a bottom surface, and having a plurality of collapsible resilient domes, each dome being substantially aligned with a corresponding actuation layer and key, each dome providing tactile feedback when a corresponding key is depressed a predetermined amount and said dome inverts, each dome including means for reducing pressure on said light source when providing said tactile feedback, each dome including a conductive area on a lower surface;

a third adhesive layer having a plurality of apertures, each of said apertures substantially aligned with a corresponding key and being bonded to the bottom surface of the tactile layer;

a spacer layer having a top surface bonded by the third adhesive layer to the tactile layer, having a bottom surface and having a plurality of apertures thereon, each aperture being substantially aligned with a corresponding key;

a fourth adhesive layer having a plurality of apertures, each of said apertures substantially aligned with a corresponding key and bonded to the bottom surface of the spacing layer; and a circuitry layer having a top surface of which at least a portion is bonded by said fourth adhesive layer to said spacing layer, having a bottom surface and a plurality of apertures therethrough, said aperture corresponding to the location of each of said keys, said light sources located on said bottom surface and extending through an above a corresponding aperture, said circuitry layer further including a plurality of conductor pairs located on a portion of said top surface corresponding to each of said plurality of keys, each conductor pair being substantially aligned with said corresponding conductive portion of said tactile layer whereby depression of the key and corresponding actuating strip collapses a corresponding dome to produce electrical contact between said conductive area and a conductor pair.

39. The keypad according to claim 38, wherein said means for reducing pressure comprises a smaller dome centrally located on said at least one resilient dome, said smaller dome comprising a means for stiffening said at least one resilient dome and for permitting passage of light from said light source to said key.

* * * * *